(12) United States Patent
Jaaskelainen et al.

(10) Patent No.: US 11,708,759 B2
(45) Date of Patent: Jul. 25, 2023

(54) INSTRUMENTED BRIDGE PLUGS FOR DOWNHOLE MEASUREMENTS

(71) Applicant: Halliburton Energy Services, Inc., Houston, TX (US)

(72) Inventors: Mikko Jaaskelainen, Katy, TX (US); Vladimir Nikolayevich Martysevich, Spring, TX (US); Ronald Glen Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 222 days.

(21) Appl. No.: 17/276,054

(22) PCT Filed: Nov. 1, 2018

(86) PCT No.: PCT/US2018/058737
§ 371 (c)(1),
(2) Date: Mar. 12, 2021

(87) PCT Pub. No.: WO2020/091703
PCT Pub. Date: May 7, 2020

(65) Prior Publication Data
US 2022/0049601 A1 Feb. 17, 2022

(51) Int. Cl.
*E21B 49/00* (2006.01)
*E21B 33/134* (2006.01)
(Continued)

(52) U.S. Cl.
CPC .............. *E21B 49/00* (2013.01); *E21B 33/12* (2013.01); *E21B 43/26* (2013.01); *E21B 47/135* (2020.05);
(Continued)

(58) Field of Classification Search
CPC ...... E21B 33/12; E21B 33/124; E21B 33/134; E21B 49/00; E21B 47/0025; E21B 47/01;
(Continued)

(56) References Cited

U.S. PATENT DOCUMENTS 6,065,538 A * 5/2000 Reimers ................ E21B 49/006
181/112
7,040,402 B2 * 5/2006 Vercaemer .............. E21B 33/13
166/253.1
(Continued)

FOREIGN PATENT DOCUMENTS

WO 2017105433 6/2017
WO 2018035498 2/2018

OTHER PUBLICATIONS

International Application No. PCT/US2018/058737, International Search Report and Written Opinion, dated Aug. 1, 2019, 12 pages.

*Primary Examiner* — Kenneth L Thompson
(74) *Attorney, Agent, or Firm* — Kilpatrick Townsend & Stockton LLP

(57) ABSTRACT

A system includes a first instrumented bridge plug positionable in a downhole wellbore environment. The first instrumented bridge plug includes an acoustic source for transmitting an acoustic signal. The system also includes a second instrumented bridge plug positionable in the downhole wellbore environment. The second instrumented bridge plug includes an acoustic sensor for receiving a reflected acoustic signal originating from the acoustic signal. The reflected acoustic signal being usable to interpret wellbore formation characteristics of the downhole wellbore environment.

19 Claims, 6 Drawing Sheets

(51) Int. Cl.
*G01V 1/46* (2006.01)
*E21B 47/135* (2012.01)
*E21B 33/12* (2006.01)
*E21B 43/26* (2006.01)
*E21B 47/18* (2012.01)
*G01V 1/133* (2006.01)
*G01V 1/22* (2006.01)
*G01V 1/50* (2006.01)
*G01V 1/52* (2006.01)

(52) U.S. Cl.
CPC .............. *E21B 47/18* (2013.01); *G01V 1/133* (2013.01); *G01V 1/226* (2013.01); *G01V 1/50* (2013.01); *G01V 1/52* (2013.01); *G01V 2210/121* (2013.01); *G01V 2210/1299* (2013.01); *G01V 2210/1429* (2013.01); *G01V 2210/324* (2013.01); *G01V 2210/646* (2013.01)

(58) Field of Classification Search
CPC ........ E21B 47/12; E21B 47/155; E21B 47/14; E21B 2210/1429; E21B 43/26; G01V 1/46; G01V 2210/121; B01V 2001/526
See application file for complete search history.

(56) References Cited

U.S. PATENT DOCUMENTS

| | | | | |
|---|---|---|---|---|
| 8,069,913 | B2* | 12/2011 | Coste | G01V 1/52 |
| | | | | 166/250.11 |
| 8,960,313 | B2* | 2/2015 | Dyer | E21B 33/127 |
| | | | | 166/387 |
| 9,051,822 | B2* | 6/2015 | Ayan | E21B 43/16 |
| 9,556,725 | B2 | 1/2017 | Fripp et al. | |
| 10,036,247 | B2* | 7/2018 | Moronkeji | E21B 47/06 |
| 10,655,456 | B2* | 5/2020 | Espe | E21B 49/08 |
| 10,689,971 | B2* | 6/2020 | Smith | E21B 33/12 |
| 10,968,737 | B2* | 4/2021 | Marsala | E21B 47/024 |
| 11,203,927 | B2* | 12/2021 | Kinn | E21B 47/16 |
| 2006/0102342 | A1 | 5/2006 | East et al. | |
| 2015/0075778 | A1 | 3/2015 | Walters et al. | |
| 2016/0047232 | A1 | 2/2016 | Palomarez | |
| 2018/0274360 | A1 | 9/2018 | Warpinski et al. | |
| 2021/0140312 | A1* | 5/2021 | Dumoit | G01V 1/46 |
| 2021/0262343 | A1* | 8/2021 | Dupont | E21B 33/1208 |

* cited by examiner

INSTRUMENTED BRIDGE PLUGS FOR DOWNHOLE MEASUREMENTS

TECHNICAL FIELD

The present disclosure relates to instrumented bridge plugs used in hydrocarbon well stimulation. More specifically, this disclosure relates to instrumented bridge plugs used to generate and measure downhole signals to identify reservoir formation characteristics before, during, and after well stimulation operations.

BACKGROUND

In hydrocarbon-producing wells, it may be beneficial to monitor physical conditions inside wellbores of the wells. Operations that monitor the physical conditions inside the wellbores often do not generate accurate or usable information. For example, surface sensors may be used to receive signals at a surface of the wellbore to predict downhole conditions within the wellbore. The signals received at the surface may experience signal attenuation and distortion due to signal dispersion within the wellbore. Based on a poor signal quality resulting from the signal attenuation and distortion, the prediction of downhole conditions and reservoir properties may lack accuracy.

DETAILED DESCRIPTION

Figure 1:
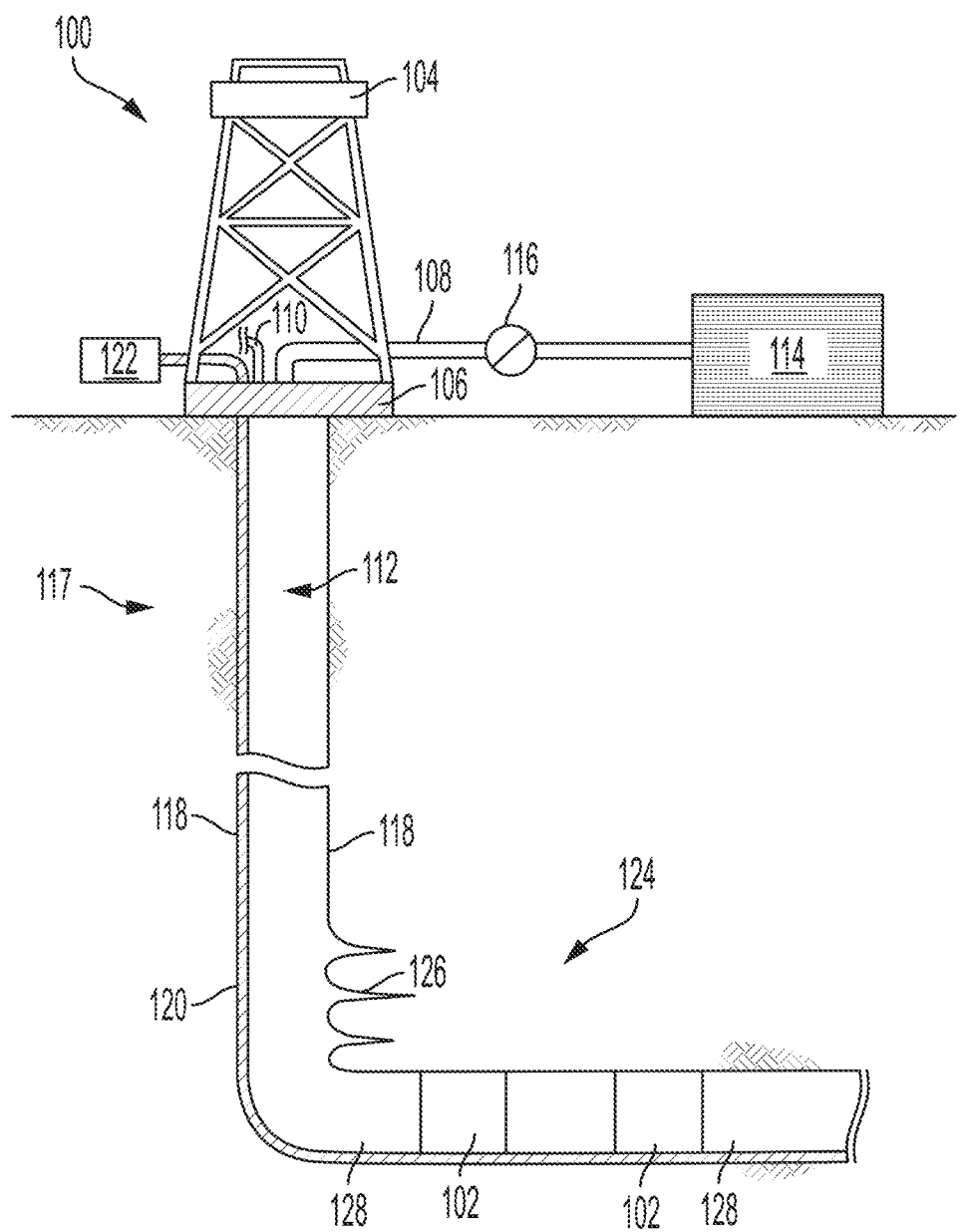
FIG. 1 is a cross-sectional view of an example of a well system that includes a series of bridge plugs according to some aspects of the present disclosure.

Certain aspects and examples of the disclosure relate to instrumented bridge plugs used for downhole measurements within a wellbore. The instrumented bridge plugs may be used to generate signals in a downhole environment within the wellbore that are representative of the physical characteristics of the formation surrounding the wellbore. The instrumented bridge plugs may include acoustic sources, acoustic sensors, or a combination thereof to generate and sense acoustic signals within the wellbore.

Bridge plugs may be deployed within a wellbore to seal portions of wells in preparation of perforating operations and other stimulation operations. Perforations may be created at zones of interest within the wellbore by generating holes in walls of casing within the wellbore and in formation surrounding the wellbore. During a stimulation operation, fluid may be injected into the wellbore and into the perforations. When fluid pressure is released from the stimulation operation, the bridge plug may prevent fluid within the wellbore downhole from the bridge plug from traveling uphole to a surface of the wellbore. The bridge plugs may also prevent fluid from the stimulation operation from traveling downhole beyond the bridge plug. It is desirable to perform downhole measurements on the wellbore and the formation surrounding the wellbore before, during, and after perforation operations and stimulation operations to assist in controlling the stimulation operation and to determine results of the stimulation operation.

To perform such downhole measurements, acoustic signals may be sensed by the acoustic sensors of the instrumented bridge plugs. These acoustic signals may be affected by the physical characteristics of the formation surrounding the wellbore. For example, the acoustic signals received by the acoustic sensor may be reflections of a generated acoustic signal off of a wellbore deformation (e.g., a perforation). Changes to the acoustic signal based on the wellbore deformation may be measured to determine a location, a type, and other physical characteristics of the wellbore deformation.

Moreover, the acoustic signals detected by the acoustic sensors may be generated by an acoustic source positioned on a bridge plug downhole within the wellbore, by a water hammer initiated at a surface of the wellbore, or by any other acoustic source. Further, the acoustic sensor may include an acoustic sensor positioned on a bridge plug downhole within the wellbore, an optical fiber run along a length of the wellbore, or any other acoustic sensor capable of detecting the acoustic signals. In an example, the detected acoustic signals originating at a surface of the wellbore (e.g., from the water hammer or other signal transducer) may undergo a noise canceling filtering process to remove noise also originating at a surface of the wellbore (e.g., machinery noise, transportation noise, etc.).

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a cross-sectional view of an example of a well system 100 that includes a series of bridge plugs 102 according to some aspects. While FIG. 1 generally depicts a land-based well system, similar systems may be operated in subsea well systems. The well system 100 may include a derrick 104 positioned over a wellhead 106. The wellhead 106 may receive a number of lines 108 and 110 to provide hydraulic access to a wellbore 112. For example, a high pressure line 108 is depicted along with a production line 110.

The high pressure line 108 may be in fluid communication with a mixing tank 114, in which stimulation fluids may be mixed for insertion into the wellbore 112. A pump 116 may pump the stimulation fluids into the wellbore 112 during a stimulation operation to a desired pressure. The production line 110 may be used to produce fluids from within the wellbore 112 to the surface. The fluids may be hydrocarbon fluids from a formation 117 surrounding the wellbore 112, or the fluids may be stimulation fluids produced after a stimulation operation is completed. Other fluids from within the wellbore 112, such as water, may also be produced using the production line 110.

During a stimulation operation of the wellbore 112, stimulation fluids (e.g., fracturing fluids, acidizing fluids, etc.) may be pumped downhole to stimulate hydrocarbon production from the formation 117. The stimulation fluids may be conveyed to the wellhead 106 using the high pressure line 108. From the wellhead 106, the stimulation fluids enter the wellbore 112 and penetrate into the formation 117. The production line 110 is provided to the wellhead 106 to recover hydrocarbons upon completion of the wellbore 112. Further, the production line 110 may be used to recover the stimulation fluids pumped into the wellbore 112 during the stimulation operation.

Further, in an example, the wellbore 112 includes a casing 118. The casing 118 may extend for a length of the wellbore 112, and the casing 118 may help support the stability of the wellbore 112. Further, the casing 118 may include a pipe that is cemented in place within wellbore 112.

An optical fiber cable 120 may be run downhole within the wellbore 112. The optical fiber cable 120 may be installed between the casing 118 and the formation 117 surrounding the wellbore 112. In another example, the optical fiber cable 120 may be installed within the pipe of the casing 118. Any other installation of the optical fiber cable 120 along the wellbore 112 is also contemplated.

An interrogator 122 (e.g., an interpretation module) may be coupled to the optical fiber cable 120. The interrogator 122 may routinely fire optical signal pulses downhole within the optical fiber cable 120. As the pulses travel along the optical fiber cable 120, back scattered light is generated and received by the interrogator 122. Perturbations or strains (e.g., acoustic signals) introduced to the optical fiber cable 120 at a downhole location may alter back propagation of light returned to the interrogator 122. An analysis of the alterations of the light returned to the interrogator 122 by the interrogator 122 may be read as data. For example, acoustic signals may be detected by the optical fiber cable 120, and the interrogator 122 may interpret the acoustic signals as physical characteristics of the wellbore 112, the casing 118, the formation 117, or any other downhole physical characteristics.

The interrogator 122 may include surface components that send the optical signal pulses into the optical fiber cable 120. The light signals propagating in the optical fiber cable 120 may be analyzed by the interrogator 122 to extract data from the light signals. In one or more examples, the interrogator 122 may rely on Rayleigh scattering to detect the data from the light signals. Additionally, the interrogator 122 may detect the data from the light signals using the Michelson principle, the Mach-Zehnder principle, the Fabry-Perot principle, other suitable interferometry configurations based on, for example, homodyne or heterodyne detection, or any other suitable detection schemes. It may be appreciated that the terms "optical signals" or "light pulse" may also include various interrogation schemes including dual pulse configurations, the use of compensation interferometers, or the use of any other technologies that enable phase extraction, intensity extraction, amplitude extraction, or any combination thereof over time from Rayleigh scattering based sensing principles.

As an optical signal pulse (e.g., a light pulse) travels from the interrogator 122 along the optical fiber cable 120, the Rayleigh backscattered light is generated by impurities within a silica lattice structure of the optical fiber cable 120. The backscattered light from the pulses may interfere with each other to generate a signal amplitude that is dependent on an amount of strain on the optical fiber cable 120. In an example, the strain on the optical fiber cable 120 depends on a perturbation of the instantaneous strain on the optical fiber cable 120. The perturbation of the instantaneous strain on the optical fiber cable 120 may depend on an acoustic signal (e.g., pressure waves) acting on the optical fiber cable 120.

The Rayleigh backscattered light from the optical fiber cable 120 may be collected at the surface using the interrogator 122 and recombined with an input optical signal to determine an amplitude and a phase associated with a depth from which the signal originated. In this manner, data resulting from the perturbation of the optical fiber cable 120 may be extracted from the Rayleigh backscattered light by the interrogator 122. Single pulse, dual pulse, swept signals, coded signals, or a combination thereof may be used in various source, detection, and interrogation schemes.

As depicted in FIG. 1, the wellbore 112 traverses the formation 117 before reaching a production region 124. A perforating gun (not shown) may perforate the casing, and the stimulation operation may generate the perforations 126 in the production region 124. The bridge plugs 102 may be employed to isolate stages 128 within the wellbore 112 during a stimulation operation, a production operation, or both. In an example, the bridge plugs 102 are deployed via wireline down a vertical portion of the wellbore 112. Upon reaching a horizontal portion of the wellbore 112, hydraulic pressure may be used to push the bridge plugs 102 into position before actuation and setting of the bridge plugs 102 by the wireline. In other examples, slickline, jointed pipe, or coiled tubing may be used to deploy the bridge plugs 102. In such examples, the bridge plugs 102 may be set through hydraulic actuation or through the use of a separate setting tool. A setting component of the bridge plug 102 may include any mechanism that causes or enables the bridge plug 102 to expand from a run-in position to a set position. Further, the bridge plug may include an elastomeric surface, or any other type of surface, that is capable of forming a seal between the bridge plug 102 and a wall of the wellbore 112 or the casing 118. The seal between the bridge plug 102 and the wall of the wellbore 112 or the casing 118 may be capable of withstanding pressure associated with a well stimulation operation.

When deployed, the bridge plugs 102 isolate downhole sections of the wellbore 102. For example, with the bridge plugs 102 deployed as depicted in FIG. 1, fracturing operations within the wellbore 112 may be focused at an area of the wellbore 112 uphole from the bridge plugs 102. Thus, localization of high pressure pumping of the fracturing fluids into the perforations 126 at the production region 124 may be accomplished.

Figure 2:
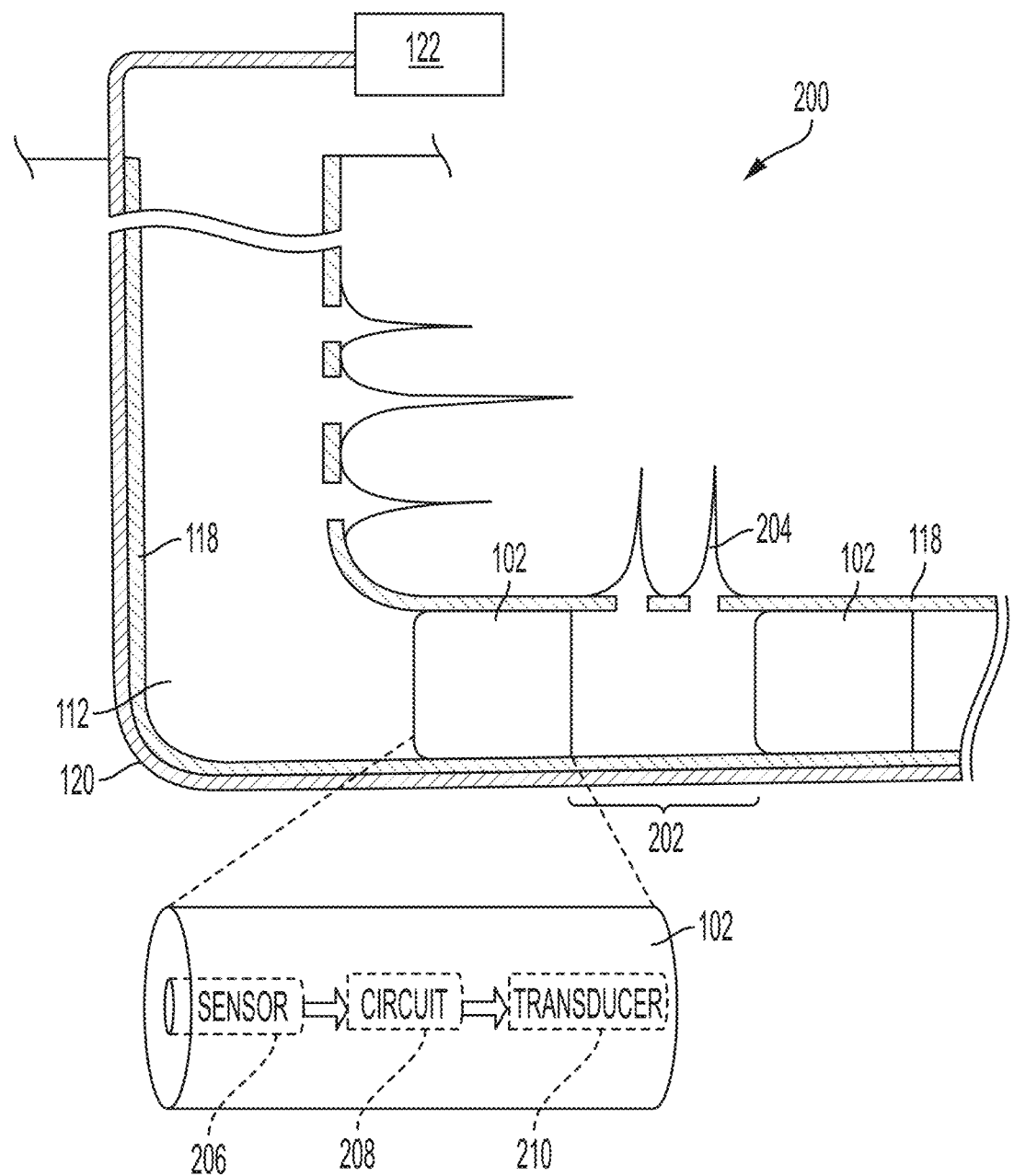
FIG. 2 is a cross-sectional view of an additional example of a well system that includes a series of bridge plugs according to some aspects of the present disclosure.

FIG. 2 is a cross-sectional view of an additional example of a well system 200 that includes a series of the bridge plugs 102 according to some aspects. The wellbore 112 (e.g., an enlarged depiction of the wellbore 112 from FIG. 1) is defined by the casing 118, which extends uphole and downhole from the depicted portion of the well system 200. Tubulars (not shown), such as coiled tubing or production tubing string) may be positioned within the casing 118. In an embodiment, the bridge plugs 102 may be positioned within the casing 118 using methods that may use significant force or impulse, such as an explosive charge, to set the bridge plug 102 within the well casing 118. In other examples, the bridge plugs 102 may be set using hydraulic actuation or through the use of a separate setting tool that radially expands the bridge plug 102 into contact with the casing 118. Slips (not shown) may be provided on the bridge plugs 102 to assist in holding the bridge plug 102 in place within the wellbore 112 or the casing 118. For example, teeth in the slips of the bridge plugs 102 may be actuated to dig into the casing 118, or the walls of the wellbore 112, to anchor the bridge plugs 102 in place.

The bridge plugs 102 may be drillable, dissolvable, or retrievable. Drillable bridge plugs 102 may be constructed of a brittle metal (e.g., iron) that can be drilled out of the wellbore 112. Retrievable bridge plugs 102 may be used to temporarily isolate portions of the wellbore 112 before being removed from the wellbore 112. Retrievable bridge plugs 102 may include anchor and sealing elements that engage and secure the retrievable bridge plugs 102 to an interior wall of the casing 118. To retrieve the retrievable bridge plugs 102, a retrieving tool may be lowered into the wellbore 112 to engage retrieving latches of the retrievable bridge plugs 102. Upon actuating the retrieving latch, the retrievable bridge plug 102 is disengaged from the casing 118, which enables removal of the retrievable bridge plug 102 from the wellbore 112.

Completion and stimulation of the wellbore 112 may include dividing a horizontal length of the wellbore 112 into planned stages 202, each of which are designated for a stimulation treatment. To promote effectiveness of the stimulation treatment, the stages 202 may be designed with, for example, two to eight perforation clusters 204 distributed uniformly along a length of the stage 202. While only one stage 202 is depicted in FIG. 2, multiple stages 202 may be positioned along a length of the wellbore 112. Further, a greater perforation cluster count (e.g., more than eight perforation clusters 204) may also be used in one or more examples.

One example completion technique is a plug and perforation completion. The plug and perforation completion is a flexible multi-stage well completion technique for cased hole wells where each stage 202 is perforated and treated independently. Knowledge from previous stages 202 (e.g., perforation sizes and lengths) may be applied to subsequent stages 202 to optimize treatment of the subsequent stages 202. When performing multi-stage treatments, a bridge plug 102 is positioned after (i.e., uphole from) each stage 202 to isolate the previous stage 202. Perforation guns are fired to generate the perforation clusters 204 before the fracturing or other stimulation operations are performed. After each stage 202 is completed, another bridge plug 102 is set uphole from the stage 202, and the process is repeated moving further uphole within the wellbore 112.

The wellbore 112 may include the optical fiber cable 120 positioned along the exterior of the casing 118. In another embodiment, the optical fiber cable 120 may be positioned along an interior of the casing 118. The optical fiber cable 120 may include any combination of lines (e.g., optical, electrical, and hydraulic lines) and reinforcement. Multiple fibers within one optical fiber cable 120 may offer redundancy and an ability to perform different operations simultaneously.

The optical fiber cable 120 may be primarily sensitive along an axis of the optical fiber cable 120. Thus, the optical fiber cable 120 may be analogous to a single continuous component geophone oriented along the wellbore 112 to allow for the recording of acoustic records. At low frequencies, the optical fiber cable 120 may be sensitive to temperature variations in addition to acoustic sensitivity.

The bridge plugs 102 may include one or more sensors 206 that provide a measurement relating to wellbore conditions within the stage 202 during various phases of construction, completion, or operation of the wellbore 112. The sensors 206 may be a number of different types of sensors depending on the parameters of interest that are monitored by the sensors 206. For example, the parameters of interest may be pressure, strain, resistivity, chemical composition, chemical concentration, flow rate, temperature, or any combination thereof.

In an example, the sensor 206 of the bridge plug 102 may include an acoustic sensor used to measure acoustic signals within the wellbore 112. The acoustic signals may include any sound or pressure signals within the wellbore 112 that interact with the sensor 206. As illustrated, the sensor 206 is in an uphole orientation (e.g., positioned on an uphole side of the bridge plug 102). However, the sensor 206 may be positioned in any orientation on the bridge plug 102. The sensor 206 including an acoustic sensor may be of any suitable configuration of electronic or mechanical construction that is responsive to acoustic signals within the wellbore 112.

The bridge plug 102 may also include processing circuitry 208 that receives the sensed measurements from the sensor 206. Upon receiving the sensed measurements from the sensor 206, the processing circuitry 208 may generate a transmission signal that is representative of the sensed measurements. A portion of the processing circuitry 208 for generating the representative signal may include an analog to digital converter, as well as various pulse limiting, pulse shaping, filtering, or amplification circuits. Such structure may be designed to remove any unwanted portions of the signal received from the sensor 206, and to condition the representative signal for further transmission.

The processing circuitry 208 may also include a mechanism for controlling the transducer 210 in various ways including controlling an amplitude and duration of transmitted pulses, linear sweeps across frequency and amplitude ranges, non-linear sweeps across frequency and amplitude ranges, or a combination thereof. While FIG. 2 shows the sensor 206 and the transducer 210 on different sides of the bridge plug 102, the sensor 206 and transducer 210 may, in some instances, be on the same side of the bridge plug 102. The circuit 208 may also include feedback loops where an output of the transducer 210 may be controlled based on measured data from the sensor 206. This feedback loop can be used to execute signal modulation of the output from transducer 210 in a highly reproducible manner. The circuit 208 may also execute certain pre-programmed sequences of signal modulation of the transducer 210, either based on a pre-defined and pre-configured tie interval or based on a measured signal response detected by the sensor 206. Moreover, operational frequency ranges for the sensor 206 and the transducer 210 may range from DC up to 100 Hz in some embodiments. In additional embodiments, the operational frequency of the sensor 206 and the transducer 210 may range up to 1000 Hz or tens of kHz in some instances.

The processing circuitry 208 may be communicatively coupled to a transducer 210. The transducer 210 may be an acoustic source that transmits an acoustic signal. The acoustic signal may be any vibrational signal that is humanly audible or not humanly audible. The acoustic signal generated by the transducer 210 may be sufficient to perturb the optical fiber cable 120 or to be received by other sensors 206 associated with other bridge plugs 102. The transducer 210 may be integrated with the processing circuitry 208 and the sensor 206 within the bridge plug 102, or the transducer 210 may be a separate structure coupled to the processing circuitry 208. The bridge plugs 102 including the sensors 206, the processing circuitry 208, the transducers 210, or any combination thereof may be referred to as instrumented bridge plugs.

When the optical fiber cable 120 is used to transmit data from the bridge plugs 102 to the surface of the wellbore 112, the transducer 210 may be an acoustic signal generator (e.g., a transmission signal generator) positioned in proximity to the casing 118 to communicate an acoustic signal through the casing 118 to the optical fiber cable 120. The acoustic signals provided from the transducer 210 to the optical fiber cable 120 may be transmission signals that are representative of the reflected acoustic signals received by the sensor 206. Because the optical fiber cable 120 may extend along an exterior of the casing 118 to one or more regions of interest, strains on the optical fiber cable 120 produced by the acoustic signals generated by the transducer 210 may be transmitted along the optical fiber cable 120 to the surface of the wellbore 112. The transmitted strains may provide information at the surface of the wellbore 112 that is associated with downhole conditions or physical properties of the wellbore 112.

The bridge plug 102 may not be limited to a single transducer 210. For example, an additional transducer 210 may be positioned in the bridge plug 102 that operates at a different frequency from the other transducer 210. Additionally, multiple transducers 210 may be used for different purposes. For example, one transducer 210 may be used to generate transmission signals for transmission along the optical fiber cable 120, while another transducer 210 may be used to generate signals that are reflected within the wellbore 112 and received at sensors 206 associated with different bridge plugs 102 located in different areas within the wellbore 112.

Light signals propagating in the optical fiber cable 120 may be analyzed to extract data from the optical fiber cable 120. For example, the interrogator 122 may extract the data from the optical fiber cable 120. The interrogator 122 may be positioned at the surface of the wellbore 112, and the interrogator 122 may interrogate signals received from the optical fiber cable 120 to identify effects of a perturbation on the optical fiber cable 120 resulting from an acoustic signal generated by the transducer 210 or other perturbation source. In an example, the received signal at the interrogator 122 is a back scattered optical signal.

The interrogator 122 may be structured to inject a laser pulse into the optical fiber cable 120. As the laser pulse travels downhole within the optical fiber cable 120, Rayleigh back scattered light is generated by impurities within a silica lattice structure of the optical fiber cable 120. The backscattered light from the pulses may interfere with each other to generate a signal amplitude or phase change that is dependent on an amount of strain on the optical fiber cable 120 at a location where the backscattered light originates. The strain on the optical fiber cable 120 may depend on the perturbation of the optical fiber cable 120 from the transducer 210 or from other acoustic signals within the wellbore 112. Accordingly, the signal generated by the backscattered light may effectively be a representation of an instantaneous strain on the optical fiber cable 120, and the instantaneous strain on the optical fiber cable 120 may be generated from sound (e.g., pressure waves and shear waves).

The Rayleigh backscattered light is collected at the surface of the wellbore 112 using the interrogator 122, and the backscattered light may be recombined with an input signal to determine an amplitude and phase associated with a depth from which the backscattered light originated. In another example, the phase, amplitude, or both associated with the depth from which the backscattered light originated may be extracted using other demodulation techniques. In this manner, a value of a measured parameter of interest may be extracted by the interrogator 122 from the backscattered light signal on the optical fiber cable 120.

Figure 3:
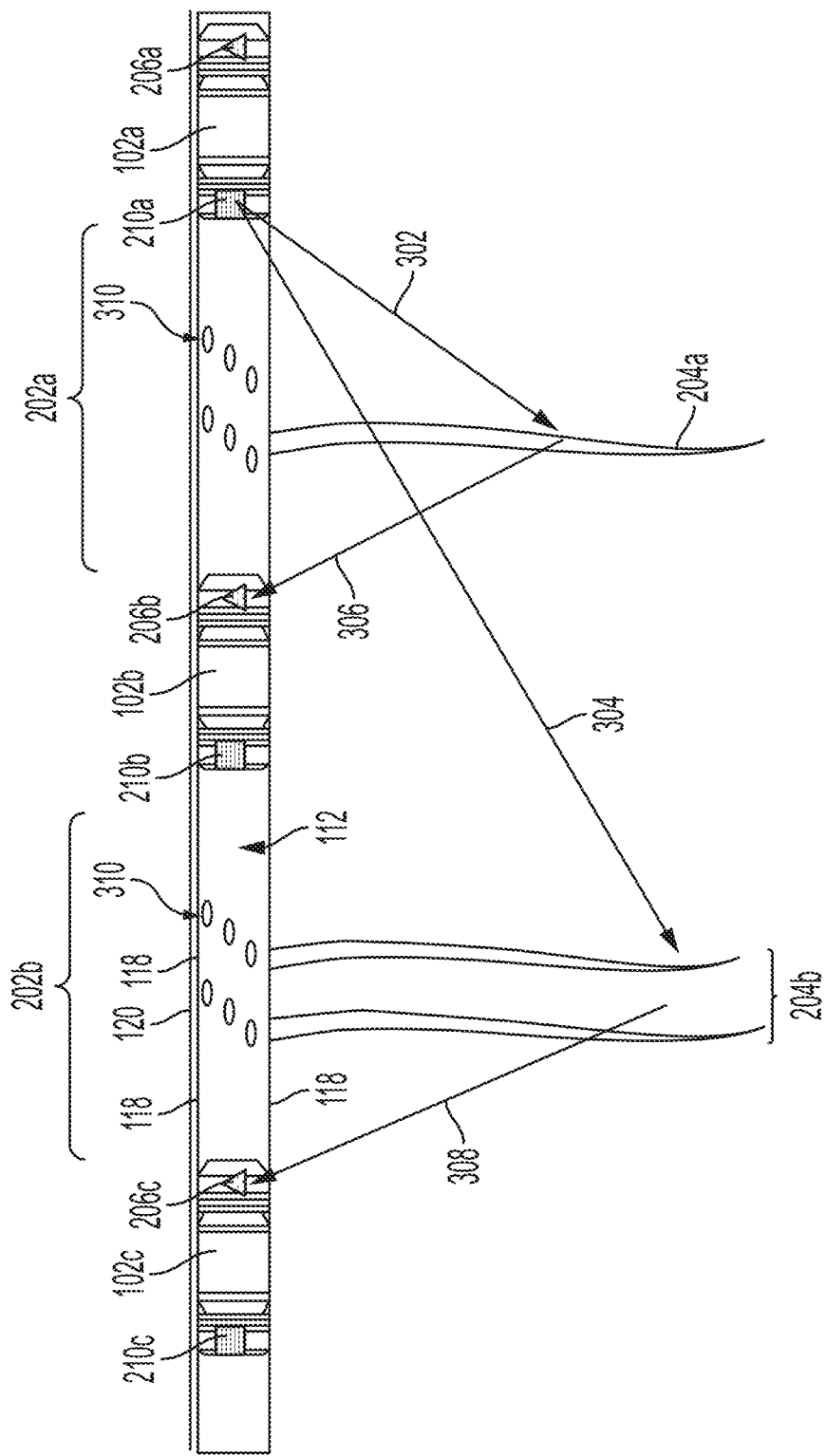
FIG. 3 is a cross-sectional view of a portion of a well that includes a series of instrumented bridge plugs according to some aspects of the present disclosure.

FIG. 3 is a cross-sectional view of a portion 300 of a wellbore 112 that includes a series of instrumented bridge plugs 102a, 102b, and 102c according to some aspects. While the portion 300 of the wellbore 112 is depicted as a horizontal section of the wellbore 112, the portion 300 may also be implemented along a vertical portion of the wellbore 112. The instrumented bridge plugs 102a, 102b, and 102c may each include an acoustic sensor 206a, 206b, or 206c and a transducer 210a, 210b, or 210c (e.g., an acoustic source). In operation, the transducer 210a may transmit acoustic or pressure signals 302 and 304 toward the formation 117. The acoustic signal 302 may reflect off of the perforation 204a within the formation 117 as a reflected acoustic signal 306. Similarly, the acoustic signal 304 may reflect off of the perforation 204b within the formation 117 as a reflected acoustic signal 308. The acoustic signals 302 and 304 may be the same signal originating from the transducer 210a, or the acoustic signals 302 and 304 may be signals that are transmitted during different time windows (e.g., one after the other) or using different frequencies (e.g., from separate transducers 210a positioned within the instrumented bridge plug 102a). Some of the transducers 210a, 210b, or 210c may be used for transmitting data to a communication cable and other transducers 210a, 210b, or 210c may be selected for reservoir specific measurements.

The reflected acoustic signals 306 and 308 may be received by the sensors 206b and 206c, respectively. The interaction of the perforations 204a and 204b on the acoustic signals 302 and 304 may generate the reflected acoustic signals 306 and 308. Accordingly, the reflected acoustic signals 306 and 308 received at the acoustic sensors 206b and 206c may be representative of reservoir properties (e.g., formation characteristics, perforation depth, perforation location, etc.).

The perforations 204a and 204b may be generated by detonating perforation charges (not shown) within the wellbore 112. The perforation charges may punch holes 310 in the casing 118, and also generate or start the perforations 204 in the formation 117. Using a fracturing or other stimulation operation, the perforations 204 may be expanded and propped to increase access to hydrocarbon rich portions of the formation 117. Because the perforations 204 are generated in a downhole location that is generally unobservable, an operator at the surface of the wellbore 112 may rely on estimates of the physical characteristics of the perforations 204. Using the transducers 210 and the acoustic sensors 206 of the instrumented bridge plugs 102a-102c, the operator may be able to receive an accurate representation of the physical characteristics of the perforations 204 over time.

The information received at the acoustic sensors 206 from the reflected acoustic signals 306 and 308 may be transmitted to the surface of the wellbore 112 using a number of data transmission techniques. Once the information reaches the surface of the wellbore 112, the interrogator 122 coverts the signals to measured reservoir properties, such as a size, depth, and location of the perforations 204. In one or more examples, the information may be transmitted to the surface of the wellbore 112 through a distributed acoustic sensing (DAS) system using the optical fiber cable 120, by sending pressure pulses through wellbore fluid within the wellbore 112 to the surface using the transducers 210a-210c, or by transmitting an electrical signal using a communication cable (not shown) coupled between the bridge plug 102 and the interrogator 122. In additional examples, the information may be transmitted to the surface of the wellbore 112 by transmitting acoustic signals that interact with the communication cable (not shown) where the interrogator 122 at the surface interrogates the communication cable. The communication cable in such an example may include optical fibers, and the interrogator 122 may be a DAS interrogation unit. In any example, the transducers 210a-210c may generate acoustic transmission signals, pressure transmission signals, or electrical transmission signals, which are representative of the reflected acoustic signals 306 and 308 and are transmitted to the surface of the wellbore 112 through the optical fiber 112, through the wellbore fluid within the wellbore 112, or using the communication cable.

The surface of the wellbore 112 may be noisy due to various noise sources such as trucks, blenders, maintenance operations, equipment operations, pressure pumping equipment, etc. By generating the acoustic signals 302 and 304 downhole within the wellbore 112 at the instrumented bridge plugs 102a-102c, the surface noise of the wellbore may have little or no effect on the acoustic signals 302 and 304. Operating the transducers 210a-210c in an environment remote from the surface noise may enable real-time measurement of the reservoir properties during a fracturing operation or other stimulation operation because the surface noise associated with such operations does not white out the acoustic signals from the transducers 210a-210c measured by the acoustic sensors 206a-206c. Further, the acoustic signals generated by the transducers 210a-210c may be altered on demand during the fracturing or stimulation operations to deviate from any downhole noise generated from the surface. For example, the acoustic signals 302 and 304 of the transducers 210a-210c may be adjusted to different amplitudes, phases, or frequencies than the noise in the wellbore 112 to enable detection of real-time reservoir property measurements.

In one or more examples, surface sensors (not shown) may be used to record surface noise and noise source characteristics at the surface of the wellbore 112. One or more of the acoustic sensors 206a-206c, or other acoustic sensors positioned in a downhole location, may be used to measure attenuated noise downhole within the wellbore 112 associated with the surface noise. Based on the surface and downhole noise measurements, transfer functions may be generated (e.g., average transfer functions or real-time transfer functions), and the transfer functions may be applied to measured downhole acoustic signals to remove or reduce noise from the measured downhole acoustic signals. In the transfer functions, a measured surface responses (e.g., including surface noise) are used as an input, and the downhole measurements from the acoustic sensors 206a-206c are used as an output. The transfer function may be generated based on manipulating the measured surface response to equal the downhole measurements. The transfer functions may also be used to filter data detected by acoustic sensors located at the surface of the wellbore 112 for enhanced signal quality in instances when the acoustic sensors 206a-206c of the bridge plugs 102a-102c are not in use.

Because either the surface noise does not have an effect on the acoustic signals transmitted and received within the wellbore 112, or the surface noise is filtered out of the acoustic signals transmitted and received within the wellbore 112, the approaches described herein enable measurements of reservoir properties before, during, and after stimulation operations. Accordingly, a wellbore stimulation operator may control fracturing or stimulation operations of the wellbore 112 in real-time or near real-time based on reservoir properties measured at a downhole location within the wellbore 112. Controlling the fracturing and stimulation operations may include modifying surface properties like pressure, liquid flow rate, proppant concentrations and rate, chemical concentrations or other properties in response to measured reservoir properties or with the objective of controlling down-hole properties like pressure. Further, controlling the fracturing and stimulation operations may include controlling down-hole flow rates, pressures for clusters of a stage that is being treated, or a combination thereof.

As depicted in FIG. 3, multiple instrumented bridge plugs 102a-102c may be used to monitor multiple stages 202a and 202b. In a wellbore 112 treated in a multistage manner, multiple instrumented bridge plugs 102a-102c may be installed within the wellbore 112. Using the multiple instrumented bridge plugs 102a-102c, fracture locations, fracture lengths, fracture complexity, crossflow between stages, crossflow between clusters within a stage after completing fracturing operations for a stage, numbers of fractures in a stage, and propped fracture length may all be determined by interpreting the reflected acoustic signals 306 and 308 received by the acoustic sensors 206b and 206c, respectively. Additional instrumented bridge plugs 102 may also be implemented along the wellbore 112 to detect additional wellbore characteristics along additional stages 202.

Further, the transducer 210a, or one of the other transducers 210b or 210c, may send multiple acoustic signals within the wellbore 112 at various timing patterns. For example, a delay between a first acoustic signal and a second acoustic signal from the transducer 210a may be sufficient to provide the first acoustic signal with enough time to reflect off of the instrumented bridge plug 102b such that the two acoustic signals meet and overlap at a selected distance from the instrumented bridge plug 102a within the wellbore 112. The two acoustic signals may constructively interfere with one another, and the resulting amplitude at the selected distance may be a sum of the two acoustic signals. The technique may enable selective targeting of specific perforations 204 (e.g., a perforation at the selected distance) or perforation clusters within one of the stages 202. The increased acoustic signal amplitude may be used to gain further insight into a fracture depth and complexity of a selected perforation 204. The combined pulse shape from the two acoustic signals may also be selectable to enhance reach or resolution of measured reservoir properties.

A sweep where a delay between the first acoustic signal and the second acoustic signal is varied may also be used. In an example, the sweep time range may be calculated using known physical properties such as, for example, acoustic travel times in fluids and distance between bridge plugs. The transducer 210a, or one of the other transducers 210b or 210c, may also continuously transmit pressure pulses at a specific pulse repetition rate or continuously sweep the delay between transmitted acoustic signals. The transducer 210a, or one of the other transducers 210b or 210c, may also alter the amplitude and frequency content of the transmitted signals.

In another example, analysis of acoustic or pressure signals from a water hammer may be analyzed to detect reservoir properties. A water hammer may refer to a pressure surge or wave caused when a fluid in motion is forced to stop or change directions suddenly. For example, a water hammer may be the result of a sudden closure of a valve. As used herein, a water hammer may result upon completion of a fracturing operation. For example, when the wellhead 106 closes a valve that provides fracturing fluid or other fluids to the wellbore 112, a pressure surge (i.e., an acoustic signal) is transmitted downhole within the wellbore 112.

The noisy nature of the water hammer (e.g., due to surface and equipment noise) may make analysis of water hammer interactions with the perforations 204 difficult. To accomplish analysis of the water hammer, the interrogator 122 may filter out surface noise in a manner similar to other surface acoustic sources, as discussed above. The acoustic signal from the water hammer may interact with the perforations 204 to generate a reflected acoustic signal. The reflected acoustic signal may be received at one or more of the acoustic sensors 206a, 206b, or 206c in a manner similar to another acoustic signal originating from the surface of the wellbore 112. In another embodiment, the reflected acoustic signal may be received directly at the optical fiber cable 120 and transmitted to the interrogator 122 using distributed acoustic sensing (DAS).

Figure 4:
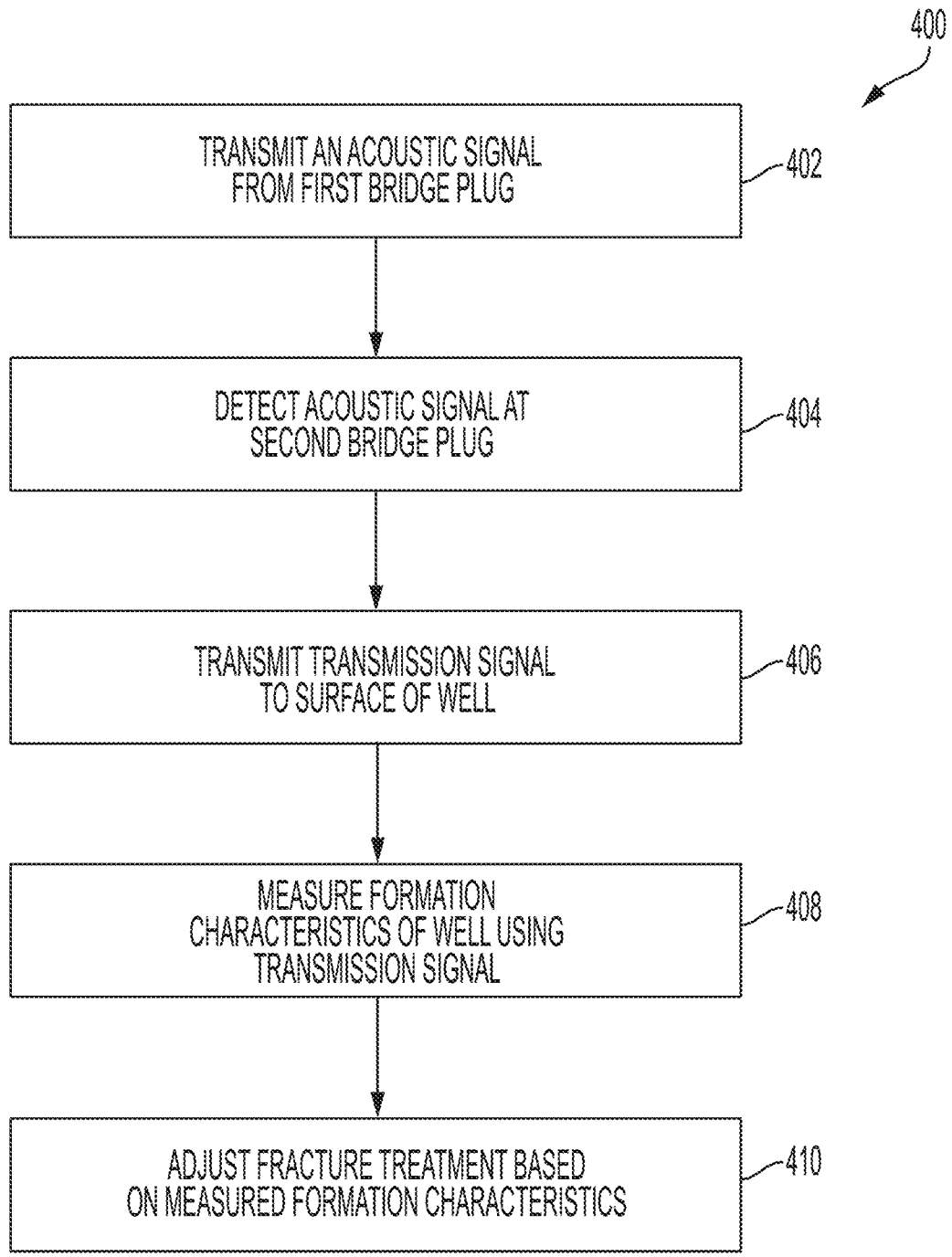
FIG. 4 is a flowchart of a process for measuring downhole formation characteristics using multiple instrumented bridge plugs according to some aspects of the present disclosure.
Figure 5:
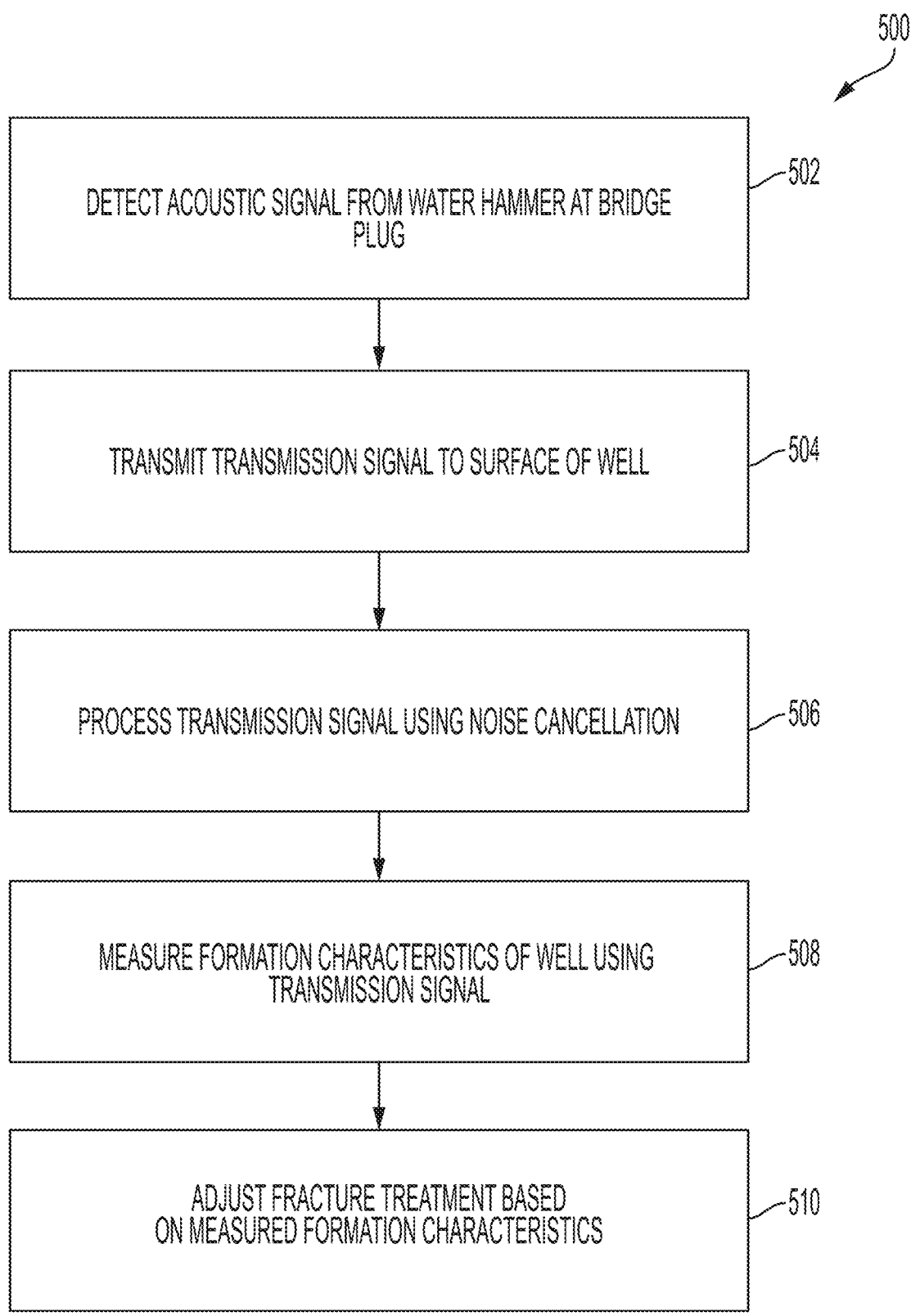
FIG. 5 is a flowchart of a process for measuring downhole formation characteristics based on an acoustic signal of a water hammer received at an instrumented bridge plug according to some aspects of the present disclosure.
Figure 6:
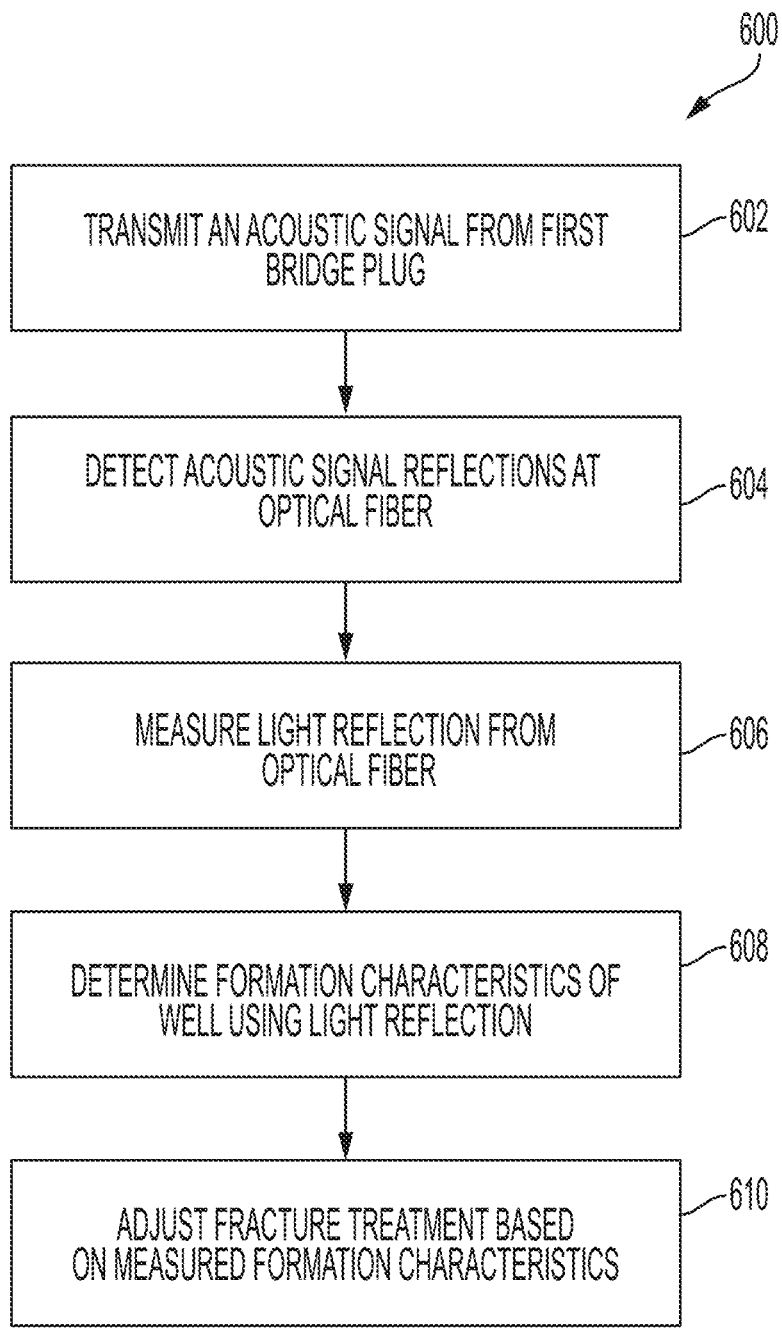
FIG. 6 is a flowchart of a process for measuring downhole formation characteristics based on measurement of an acoustic signal from an instrumented bridge plug at an optical fiber according to some aspects of the present disclosure.

FIGS. 4-6 describe processes for detecting formation characteristics surrounding the wellbore 112 using the systems and techniques described above with respect to FIGS. 1-3. For example, FIG. 4 is a flowchart of a process 400 for measuring downhole formation characteristics using multiple instrumented bridge plugs 102 according to some aspects. At block 402, the process 400 involves transmitting an acoustic signal from a first bridge plug 102. The acoustic signal (or other pressure signal) may be transmitted from a transducer 210 of the first bridge plug 102. Upon transmission of the acoustic signal, the acoustic signal may interact with the downhole formation characteristics to generate a reflected acoustic signal. The downhole formation characteristics may include the perforations 204 or other physical characteristics or deformities within the wellbore 112 (e.g., debris buildup at various locations within the wellbore 112).

At block 404, the process 400 involves detecting the reflected acoustic signal at a second bridge plug 102. The reflected acoustic signal may be detected at an acoustic sensor 206 integrated with the second bridge plug 102. Further, the reflected acoustic signal, having interacted with formation characteristics within the wellbore 112, may be interpreted by the interrogator 122 to identify the formation characteristics.

At block 406, the process 400 involves transmitting a transmission signal to a surface of the wellbore 112. The transmission signal may be a representation of the reflected acoustic signal. In an example, a transducer 210 of the second bridge plug 102 generates the transmission signal. The transducer 210 may direct the transmission signal toward the optical fiber cable 120, which transmits data associated with the transmission signal to the interrogator 122 for processing. In another example, the transducer 210 sends the transmission signal as an acoustic or pressure signal uphole within the wellbore 112 or as an electrical signal along a communication line run within the wellbore 112. A sensor positioned at a surface of the wellbore 112 receives the transmission signal and provides the associated data to the interrogator 122 for processing.

At block 408, the process 400 involves measuring formation characteristics using the transmission signal received at the surface of the wellbore 112. As discussed above with respect to FIG. 3, the interrogator 122 may automatically extract information about the perforations 204 within the wellbore 112 from the transmission signal. For example, the information about the perforations 204 may include fracture locations, fracture lengths, numbers of fractures in a stage 202, and propped fracture length and how the fractures evolve over time during a fracturing operation.

At block 410, the process 400 involves adjusting a fracture treatment or other stimulation treatment of the wellbore 112 based on the measured formation characteristics. For example, if the measured formation characteristics indicate that the perforations 204 deviate from an expected or desired fracture location, fracture length, number of fractures in the stage 202, fluid distribution across clusters within the stage 202, or proppant distribution across clusters within the stage 202, the fracture operation may be adjusted to compensate for the deviation. In such an example, the pressure or rate of the fracture operation may be adjusted and a mixture of the stimulation fluid (e.g., a proppant concentration, a chemical composition, or both) may also be adjusted. Select chemicals may be used to temporarily change fluid density, viscosity, bonding between proppant particles, fluid friction in the well bore, fluid friction in the fractures, or any combination thereof until a desired state has been reached.

The process 400 may be performed before a stimulation operation, during the stimulation operation, and after the stimulation operation. Further, because the transducer 210 of the first bridge plug 102 and the acoustic sensor 206 of the second bridge plug 102 are both located in downhole locations within the wellbore 112, surface noise has limited or no effect on the acoustic signal received by the acoustic sensor 206 of the second bridge plug 102.

FIG. 5 is a flowchart of a process 500 for measuring downhole formation characteristics based on an acoustic signal of a water hammer received at an instrumented bridge plug 102 according to some aspects. At block 502, the instrumented bridge plug 102 detects an acoustic signal originating from a water hammer. The water hammer may be generated when the wellhead 106 closes a valve that provides fracturing fluid or other fluids to the wellbore 112. Other actions may also generate a water hammer signal that is suitable for obtaining formation characteristics within the wellbore 112.

The instrumented bridge plug 102 may include an acoustic sensor 206 that is integrated with the instrumented bridge plug 102. The acoustic sensor 206 may be positioned within the instrumented bridge plug 102 such that the acoustic sensor 206 is able to detect the acoustic signal or pressure wave generated by the water hammer. Because the acoustic signal reflects off of surfaces within the wellbore 112, the reflected signal received by the acoustic sensor 206 may include information about the formation characteristics.

In another example, at block 502, the optical fiber cable 120 may detect the acoustic signal that originated from the water hammer. For example, the optical fiber cable 120 may function as a distributed acoustic sensor (DAS). The optical fiber cable 120 may be able to detect changes in the reflected acoustic signals at locations of perforations 204 within the wellbore 112. The change in the reflected signal detected by the optical fiber cable 120 may result in detection of information about formation characteristics.

In either example, at block 504, transmission signals representative of the reflected acoustic signals are transmitted to a surface of the wellbore 112. In an example, a transducer 210 of the instrumented bridge plug 102 generates the transmission signal. The transducer 210 may direct the transmission signal toward the optical fiber cable 120, which transmits data associated with the transmission signal to the interrogator 122 for processing. In another example, the transducer 210 sends the transmission signal as an acoustic or pressure signal uphole within the wellbore 112. An acoustic sensor positioned at a surface of the wellbore 112 receives the transmission signal and provides the associated data to the interrogator 122 for processing. In the example where the optical fiber cable 120 directly detects the reflected acoustic signal, the transmission signal may be the backscattered light within the optical fiber cable 120 that is transmitted uphole to the interrogator 122.

At block 506, the process 500 involves processing the transmission signal at the interrogator 122 to remove noise associated with the water hammer. Removing noise may involve filtering out surface noise using transfer functions, as described above with reference to FIG. 3, or removing noise may involve filtering the transmission signal using a filter (e.g., a band-pass filter, a low-pass filter, a high-pass filter, etc.) capable of removing noise present in the acoustic signal originating from the water hammer. Removing noise from the transmission signal enables the interrogator 122 to analyze the transmission signal to detect formation characteristics indicated by interactions of the acoustic signal of the water hammer with the formation characteristics.

At block 508, the process 500 involves measuring formation characteristics using the processed transmission signal. As discussed above with respect to FIG. 3, the interrogator 122 may automatically extract information about the perforations 204 within the wellbore 112 from the transmission signal. For example, the information about the perforations 204 may include fracture locations, fracture lengths, numbers of fractures in a stage 202, and propped fracture length.

At block 510, the process 500 involves adjusting a fracture treatment or other stimulation treatment of the wellbore 112 based on the measured formation characteristics. For example, if the measured formation characteristics indicate that the perforations 204 deviate from an expected or desired fracture location, fracture length, number of fractures in the stage 202, fluid distribution across clusters within the stage 202, or proppant distribution across clusters within the stage 202, the fracture operation may be adjusted to compensate for the deviation. In such an example, the pressure or rate of the fracture operation may be adjusted and a mixture of the stimulation fluid (e.g., a proppant concentration, a chemical composition, or both) may also be adjusted. Select chemicals may be used to temporarily change fluid density, viscosity, bonding between proppant particles, fluid friction in the well bore, fluid friction in the fractures, or any combination thereof until a desired state has been reached.

FIG. 6 is a flowchart of a process 600 for measuring downhole formation characteristics based on measurement of an acoustic signal from an instrumented bridge plug 102 at an optical fiber cable 120 according to some aspects. At block 602, the process 600 involves transmitting an acoustic signal from a first bridge plug 102. The acoustic signal (or other pressure signal) may be transmitted from a transducer 210 of the first bridge plug 102. Upon transmission of the acoustic signal, the acoustic signal may interact with the downhole formation characteristics to generate a reflected acoustic signal. The downhole formation characteristics may include the perforations 204 or other physical characteristics or deformities within the wellbore 112 (e.g., debris buildup at various locations within the wellbore 112).

At block 604, the process 600 involves detecting the reflected acoustic signal at an optical fiber cable 120 running along the wellbore 112. The optical fiber cable 120 may function as a distributed acoustic sensor (DAS) to detect changes in the reflected acoustic signals at locations of perforations 204 within the wellbore 112. The change in the reflected signal detected by the optical fiber cable 120 may result in detection of information about formation characteristics.

At block 606, the process 600 involves measuring light reflections from the optical fiber cable 120. In an example, the optical fiber cable 120 provides the light reflections to the interrogator 122. The light reflections (e.g., Rayleigh backscattered light) may result from perturbations or strains (e.g., acoustic signals) introduced to the optical fiber cable 120 from the acoustic signal transmitted by the first bridge plug 102. The interrogator 122 may analyze the light reflections to determine formation characteristics.

At block 608, the process 600 involves measuring formation characteristics using the light reflections received at the interrogator 122. As discussed above with respect to FIG. 3, the interrogator 122 may automatically extract information about the perforations 204 within the wellbore 112 from the light reflections in the optical fiber cable 120 indicative of the reflected acoustic signal originating from the acoustic signal transmitted by the first bridge plug 102. The information about the perforations 204 may include fracture locations, fracture lengths, numbers of fractures in a stage 202, and propped fracture length.

At block 610, the process 600 involves adjusting a fracture treatment or other stimulation treatment of the wellbore 112 based on the measured formation characteristics. For example, if the measured formation characteristics indicate that the perforations 204 deviate from an expected or desired fracture location, fracture length, number of fractures in the stage 202, fluid distribution across clusters within the stage 202, or proppant distribution across clusters within the stage 202, the fracture operation may be adjusted to compensate for the deviation. In such an example, the pressure or rate of the fracture operation may be adjusted and a mixture of the stimulation fluid (e.g., a proppant concentration, a chemical composition, or both) may also be adjusted. Select chemicals may be used to temporarily change fluid density, viscosity, bonding between proppant particles, fluid friction in the well bore, fluid friction in the fractures, or any combination thereof until a desired state has been reached.

In some aspects, systems, devices, and methods for determining formation characteristics using instrumented bridge plugs are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system, comprising: a first instrumented bridge plug positionable in a downhole wellbore environment, the first instrumented bridge plug comprising an acoustic source for transmitting an acoustic signal; and a second instrumented bridge plug positionable in the downhole wellbore environment, the second instrumented bridge plug comprising an acoustic sensor for receiving a reflected acoustic signal originating from the acoustic signal, the reflected acoustic signal being usable to interpret formation characteristics of the downhole wellbore environment.

Example 2 is the system of example 1, wherein the second instrumented bridge plug comprises: an acoustic source to transmit a first set of acoustic signals to one or more additional instrumented bridge plugs; and a transmission signal generator to generate a transmission signal representative of the reflected acoustic signal.

Example 3 is the system of example 2, further comprising: an interpretation module to interpret the formation characteristics using the reflected acoustic signal received by the acoustic sensor, wherein the transmission signal generator transmits the transmission signal to the interpretation module as an acoustic signal to a surface of a wellbore.

Example 4 is the system of examples 1-3, further comprising: an interpretation module to interpret the formation characteristics using the reflected acoustic signal received by the acoustic sensor; and an optical fiber positionable along a length of a wellbore to receive a transmission signal representative of the reflected acoustic signal from the second instrumented bridge plug, wherein the interpretation module interprets the formation characteristics using the transmission signal received from the optical fiber.

Example 5 is the system of example 4, wherein the interpretation module is positionable to transmit a light pulse into the optical fiber, and wherein the transmission signal is generated to interact with the light pulse in the optical fiber to provide data representative of the reflected acoustic signal to a surface of the wellbore.

Example 6 is the system of examples 1-5, further comprising: an interpretation module to interpret formation characteristics using the reflected acoustic signal received by the acoustic sensor; and a communication cable communicatively coupled to the second instrumented bridge plug and the interpretation module, wherein the second instrumented bridge plug transmits a transmission signal representative of the reflected acoustic signal along the communication cable to the interpretation module.

Example 7 is the system of examples 1-6, wherein the reflected acoustic signal comprises reflections of the acoustic signal off of the formation characteristics of a wellbore.

Example 8 is the system of examples 1-7, further comprising: a third instrumented bridge plug positionable in the downhole wellbore environment comprising an additional acoustic sensor positionable to receive an additional reflected acoustic signal originating from the acoustic signal, the additional reflected acoustic signal being usable to interpret additional formation characteristics.

Example 9 is the system of examples 1-8, wherein the formation characteristics comprise fracture locations, fracture lengths, numbers of fractures in a stage, propped fracture length, or any combination thereof.

Example 10 is a method, comprising: detecting, at an acoustic sensor deployed at a downhole location of a well, a reflected acoustic signal; transmitting a transmission signal to a surface of the well, the transmission signal representative of the reflected acoustic signal; and measuring formation characteristics of the well using the transmission signal.

Example 11 is the method of example 10, further comprising: transmitting, by an acoustic source of a first instrumented bridge plug deployed at an additional downhole location of a well, an acoustic signal, wherein the reflected acoustic signal originates from the acoustic signal, and wherein the acoustic sensor is integrated with a second instrumented bridge plug.

Example 12 is the method of examples 10 or 11, wherein the acoustic sensor comprises an optical fiber run along the well, and transmitting the transmission signal to the surface of the well comprises transmitting a light reflection to the surface from the optical fiber.

Example 13 is the method of examples 10-12, wherein the transmission signal is an additional acoustic signal, and transmitting the transmission signal to the surface of the well comprises: transmitting the transmission signal to apply acoustic strain on an optical fiber deployed along a length of the well.

Example 14 is the method of examples 10-13, wherein the reflected acoustic signal originates from a water hammer signal.

Example 15 is the method of example 14, further comprising processing the transmission signal using noise cancellation to filter surface noise from the transmission signal.

Example 16 is the method of examples 10-15, further comprising: transmitting an acoustic signal originating from an acoustic source at a surface of the well to generate the reflected acoustic signal; and processing the transmission signal using noise cancellation to filter surface noise from the transmission signal.

Example 17 is the method of examples 10-16, further comprising: controlling a fracturing operation or other stimulation treatment of the well using the measured formation characteristics.

Example 18 is an instrumented bridge plug, comprising: a setting component usable to set the instrumented bridge plug in a downhole location within a wellbore and to isolate one section of the wellbore from another section of the wellbore; and an acoustic sensor positionable to receive a reflected acoustic signal originating from an acoustic signal generated by an acoustic source of an additional instrumented bridge plug in an additional downhole location within the wellbore.

Example 19 is the instrumented bridge plug of example 18, further comprising: an acoustic source positionable to transmit an additional acoustic signal to an additional acoustic sensor of the additional instrumented bridge plug.

Example 20 is the instrumented bridge plug of examples 18 or 19, further comprising: a transmission signal generator to generate a transmission signal representative of the reflected acoustic signal.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system, comprising:
a first instrumented bridge plug positionable in a downhole wellbore environment, the first instrumented bridge plug comprising an acoustic source for transmitting an acoustic signal;
a second instrumented bridge plug positionable in the downhole wellbore environment, the second instrumented bridge plug comprising an acoustic sensor for receiving a reflected acoustic signal originating from the acoustic signal, the reflected acoustic signal being usable to interpret formation characteristics of the downhole wellbore environment;
an interpretation module positionable to interpret the formation characteristics using the reflected acoustic signal received by the acoustic sensor; and
an optical fiber positionable along a length of a wellbore to receive a transmission signal representative of the reflected acoustic signal from the second instrumented bridge plug, wherein the interpretation module interprets the formation characteristics using the transmission signal received from the optical fiber, wherein the interpretation module is positionable to transmit a light pulse into the optical fiber, and wherein the transmission signal is generated to interact with the light pulse in the optical fiber to provide data representative of the reflected acoustic signal to a surface of the wellbore.

2. The system of claim 1, wherein the second instrumented bridge plug comprises:
- an acoustic source to transmit a first set of acoustic signals to one or more additional instrumented bridge plugs; and
- a transmission signal generator to generate a transmission signal representative of the reflected acoustic signal.

3. The system of claim 2, further comprising:
- an interpretation module to interpret the formation characteristics using the reflected acoustic signal received by the acoustic sensor, wherein the transmission signal generator transmits the transmission signal to the interpretation module as an acoustic signal to a surface of a wellbore.

4. The system of claim 1, further comprising:
- an interpretation module to interpret formation characteristics using the reflected acoustic signal received by the acoustic sensor; and
- a communication cable communicatively coupled to the second instrumented bridge plug and the interpretation module, wherein the second instrumented bridge plug transmits a transmission signal representative of the reflected acoustic signal along the communication cable to the interpretation module.

5. The system of claim 1, wherein the reflected acoustic signal comprises reflections of the acoustic signal off of the formation characteristics of a wellbore.

6. The system of claim 1, further comprising:
- a third instrumented bridge plug positionable in the downhole wellbore environment comprising an additional acoustic sensor positionable to receive an additional reflected acoustic signal originating from the acoustic signal, the additional reflected acoustic signal being usable to interpret additional formation characteristics.

7. The system of claim 1, wherein the formation characteristics comprise fracture locations, fracture lengths, numbers of fractures in a stage, propped fracture length, or any combination thereof.

8. A method, comprising:
- detecting, at an acoustic sensor deployed at a downhole location of a well, a reflected acoustic signal;
- transmitting a transmission signal to a surface of the well, the transmission signal representative of the reflected acoustic signal;
- measuring formation characteristics of the well using the transmission signal; and
- controlling a fracturing operation or other stimulation treatment of the well using the measured formation characteristics.

9. The method of claim 8, further comprising:
- transmitting, by an acoustic source of a first instrumented bridge plug deployed at an additional downhole location of a well, an acoustic signal, wherein the reflected acoustic signal originates from the acoustic signal, and wherein the acoustic sensor is integrated with a second instrumented bridge plug.

10. The method of claim 8, wherein the acoustic sensor comprises an optical fiber run along the well, and transmitting the transmission signal to the surface of the well comprises transmitting a light reflection to the surface from the optical fiber.

11. The method of claim 8, wherein the transmission signal is an additional acoustic signal, and transmitting the transmission signal to the surface of the well comprises:
- transmitting the transmission signal to apply acoustic strain on an optical fiber deployed along a length of the well.

12. The method of claim 8, wherein the reflected acoustic signal originates from a water hammer signal.

13. The method of claim 12, further comprising processing the transmission signal using noise cancellation to filter surface noise from the transmission signal.

14. The method of claim 8, further comprising:
- transmitting an acoustic signal originating from an acoustic source at a surface of the well to generate the reflected acoustic signal; and
- processing the transmission signal using noise cancellation to filter surface noise from the transmission signal.

15. A method, comprising:
- detecting, at an acoustic sensor deployed at a downhole location of a well, a reflected acoustic signal, wherein the reflected acoustic signal originates from a water hammer signal;
- transmitting a transmission signal to a surface of the well, the transmission signal representative of the reflected acoustic signal; and
- measuring formation characteristics of the well using the transmission signal.

16. The method of claim 15, wherein the acoustic sensor comprises an optical fiber run along the well, and transmitting the transmission signal to the surface of the well comprises transmitting a light reflection to the surface from the optical fiber.

17. The method of claim 15, wherein the transmission signal is an additional acoustic signal, and transmitting the transmission signal to the surface of the well comprises:
- transmitting the transmission signal to apply acoustic strain on an optical fiber deployed along a length of the well.

18. The method of claim 15, further comprising processing the transmission signal using noise cancellation to filter surface noise from the transmission signal.

19. The method of claim 15, further comprising:
- transmitting an acoustic signal originating from an acoustic source at a surface of the well to generate the reflected acoustic signal; and
- processing the transmission signal using noise cancellation to filter surface noise from the transmission signal.

* * * * *